United States Patent [19]

Green et al.

[11] 4,149,550
[45] Apr. 17, 1979

[54] MOULDED FIBROUS MATERIAL

[75] Inventors: Kieron P. Green, Thame; Bruce R. Inglis, High Wycombe; Roger A. Allen, Great Missenden; Roger W. Tringham, Beaconsfield, all of England

[73] Assignee: Wiggins Teape Limited, Hampshire, England

[21] Appl. No.: 820,387

[22] Filed: Jul. 29, 1977

[30] Foreign Application Priority Data

Aug. 2, 1976 [GB] United Kingdom ............... 32179/76

[51] Int. Cl.² ...................... B32B 15/027; D02G 3/00
[52] U.S. Cl. ...................... 131/266; 131/267; 131/269; 428/364; 428/367; 428/372; 428/373; 428/375
[58] Field of Search ............... 428/364, 357, 372, 373, 428/374, 375, 367; 131/266, 267, 268, 269; 156/180

[56] References Cited

U.S. PATENT DOCUMENTS

| 2,252,999 | 8/1941 | Wallach | 428/364 |
|---|---|---|---|
| 2,688,380 | 9/1954 | MacHenry | 156/180 X |
| 3,095,343 | 6/1963 | Berger | 156/180 |
| 3,189,506 | 6/1965 | Cobb, Jr. et al. | 156/180 |
| 3,359,148 | 12/1967 | Fukui | 156/180 |
| 3,390,039 | 6/1968 | Caughman et al. | 156/180 X |
| 3,418,187 | 12/1968 | Reeder et al. | 156/180 |
| 3,442,739 | 5/1969 | Johnson | 156/180 |
| 3,595,245 | 7/1971 | Buntin et al. | 156/180 X |
| 3,740,304 | 6/1973 | Okumuro et al. | 428/394 |
| 4,034,765 | 7/1977 | Hall | 131/10 A |

Primary Examiner—Lorraine T. Kendell
Attorney, Agent, or Firm—Imirie, Smiley & Guay

[57] ABSTRACT

A fibrous element comprising an elongated structure having a fibrous core with the fibres arranged in random orientation, said core being stiffened and enclosed by a fibrous crust integral with the core and formed as a surface layer of greater density.

17 Claims, 10 Drawing Figures

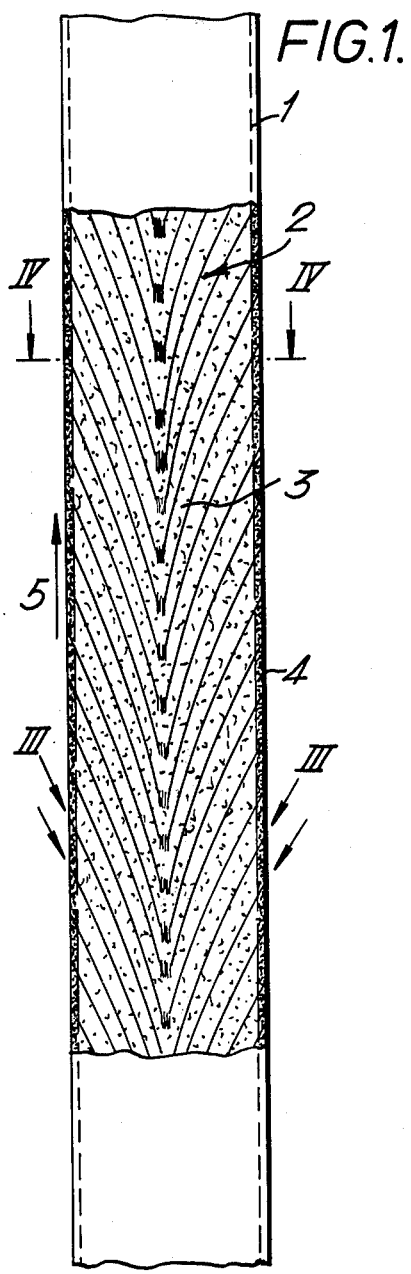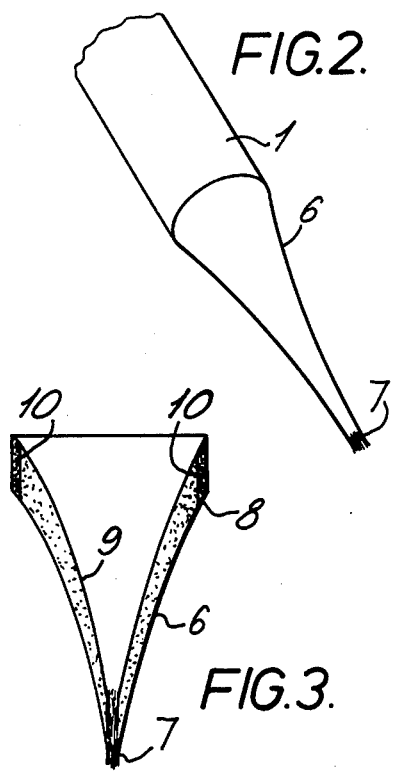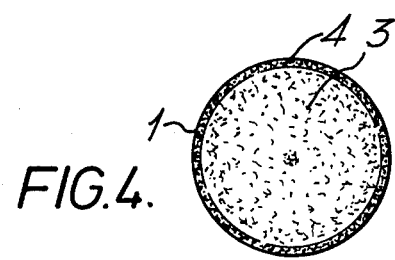

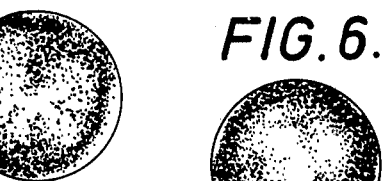
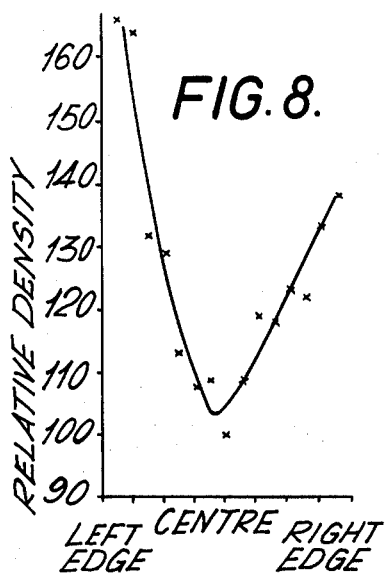
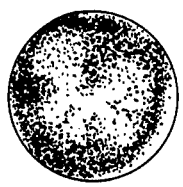
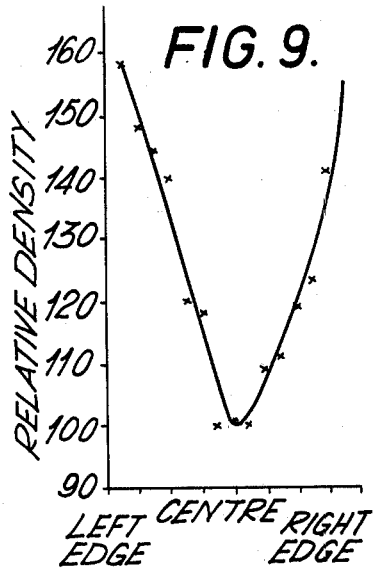
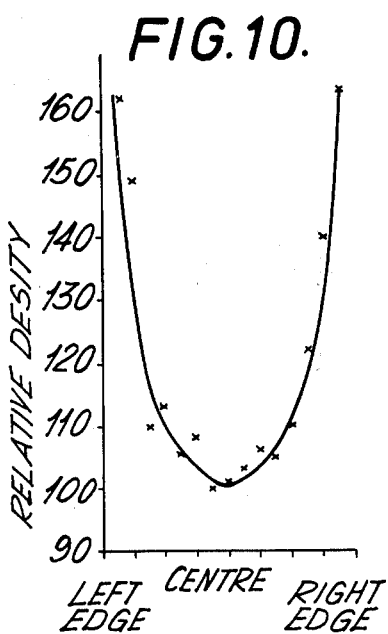
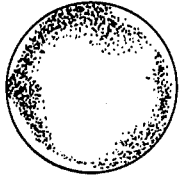

MOULDED FIBROUS MATERIAL

This invention relates to elongated fibrous structures, principally but not exclusively for use in a sub-divided form as cigarette filters.

The cigarette industry predominantly uses filters of two basic kinds, together with a third kind consisting of a composite of the first two.

The main kind of basic filter in use consists of cellulose acetate in the form of a fibrous tow. The tow is treated with a plasticizer such as triacetin to provide a partial bonding of the fibres, and is wrapped with paper (commonly known as the "plug wrap") to retain the structure in a cylindrical form. Thus when the filter is incorporated in a cigarette, a second wrap must be applied to retain the filter element in contact with the prepared tobacco column. This second wrap (commonly known as the "tipping band") may have a simulated cork tip appearance.

The second basic form of filter currently in use has a core of crimped paper. In this form, the use of an initial wrapper is essential in order to retain the filter element in a cylindrical form. The use of a double wrap in the finished cigarette as described above is therefore unavoidable where crimped paper filters are used. Such filters also tend to present an unattractive end appearance and are susceptible to uneven staining in use. Furthermore, the crimped paper structure can give rise to uneven hardness in the filter and can render it difficult to handle in high speed cigarette manufacturing machinery.

The third form of filter, known as a "dual" filter, was developed with the objective of overcoming certain of the disadvantages of the first two kinds of filter, and consists of a cylindrical segment of each kind held in axial engagement by a paper wrapper. Since the filter is assembled on the cigarette with the cellulose acetate portion exposed, the end appearance is improved and the tendency to softness is to some extent alleviated. However, the manufacture of such filters is more expensive due to the necessity for precise handling of the alternating segments. Furthermore, handling difficulties can occur, as with the basic kinds of filter, and the "dual" filter does not avoid the double wrapping problem discussed above. Indeed, a third wrap must be provided to hold the two cylindrical elements together.

For any of the above filters, a characteristic curve relating total particulate matter filtration efficiency to draw resistance can be obtained. For a given draw resistance, the crimped paper filter exhibits a higher filtration efficiency than cellulose acetate. The dual filter falls between the two in relation to the proportions of the crimped paper and cellulose acetate component it contains.

It is among the objects of the present invention to provide a filter element which avoids the necessity for an initial paper wrap, and which exhibits a substantially enhanced filtration efficiency as compared with cellulose acetate at the same draw resistance. The filter of the invention also exhibits a hardness comparable with cellulose acetate filters and substantially better than crimped paper filters and has an acceptable end appearance. The filter is less susceptible to uneven end staining and is capable of being handled with ease in cigarette manufacturing machinery.

According to the present invention a fibrous element comprises an elongated structure having a fibrous core with the fibres arranged in random orientation, said core being stiffened and enclosed by a fibrous crust integral with the core and formed as a surface layer of greater density.

The invention thus provides a fibrous structure having a fibrous core for effecting filtration of gases, and the fibrous surface layer stiffens the structure and provides a casing effect which serves to maintain the integrity of the filter formed by the core.

Co-pending U.S. patent application No. 820,388, filed July 29, 1977 and corresponding to British patent application No. 32180/76, filed August 2, 1976, in the name of the present applicants, which applications are incorporated herein by reference, are directed to a method and apparatus for forming an elongated fibrous element from an aqueous dispersion of fibres similar to a papermaking stock. The fibrous dispersion, which may comprise cellulose fibres or a mixture of cellulose and synthetic fibres, is injected into a foraminous support formed into a tube, the tube being subjected externally to a vacuum. The suspension medium is thus removed through the tube walls so that the fibres are caused to deposit on the inner faces thereof to form a rod. The fibrous elements of the present invention may thus optionally be formed by the method and apparatus described in the aforementioned patent application.

The casing effect of the crust stems from the higher proportion of fibres in the surface layer which are oriented length wise, and it has been found that the required orientation can be obtained by controlling the efflux ratio (that is the ratio of the velocities of the fibrous suspension and the foraminous support when apparatus as set forth in British patent application No. 32180/76 is used). The minimum efflux ratio depends upon the type of fibre used but for high alpha cellulose fibres of the kind used for the manufacture of cigarette filters the minimum ratio is in the region of 10:1.

The invention further provides an elongated fibrous structure of the kind defined, which, when parted under tension, exhibits substantially coniform interfaces at the point of separation. Preferably, the fibrous structure has a substantially uniform integrity but contains coniform structures which define at their peripheries the fibrous crust.

The invention also includes a smoking product incorporating a filter made from the fibrous element.

The invention will now be further described with reference to the accompanying drawing in which:

FIG. 1 is a sectional elevation along the centre of a portion of a fibrous structure according to the invention;

FIG. 2 is a perspective view of male portion of a structure similar to that shown in FIG. 1 after parting by the application of tension;

FIG. 3 is a sectional elevation of one of the interfitting coniform fibrous elements extending between the lines III—III of FIG. 1; and FIG. 4 is a sectional elevation on the lines IV—IV of FIG. 1.

FIGS. 5, 6 and 7 are contact beta radiographs through sections approximately 1.3 millimeters thick, of filter rod structures according to the invention, the exposure time being approximately seven hours. FIGS. 8, 9 and 10 are graphs, showing, for the sections of FIGS. 5, 6 and 7 respectively, the relative material densities determined along two diameters by a beta radioscanner operated in one millimeter steps.

Referring first to FIG. 1 this shows a section 1 of a fibrous element in the form of a longitudinal fibrous structure which is cut away at 2 to show a fibrous core zone 3 and a fibrous crust formed as a surface layer 4 of higher density than the core.

In use, for example as a cigarette filter, and assuming cigarette smoke to be passing along the filter in the direction of the arrow 5, filtration will be effected primarily by the fibres in the core zone 3, whilst the surface layer 4 will also stiffen the structure. In comparison with a wrapped filter this form of construction permits greater radial permeation of gases to or from the core.

FIG. 2 shows the manner in which the filter structure separates to exhibit substantially coniform interfaces at the point of separation when subjected to tension. It will be noted that the outer surface exhibits a slight convexity at 6 and terminates in a central tuft 7. The convex surface 6 and tuft 7 will be seen again on the coniform element 8 shown in FIG. 3. The coniform element 8 also exhibits a recess 9 with which the convex surface 6 and tuft 7 of the next element are inter-felted prior to parting of the element under tension.

The material appears to have a layering similar to the layering in paper which is not discernible to the eye or visual laboratory investigation techniques and which can only be ascertained by separation processes.

It will be seen that the peripheral portions of the element 8 form zones 10 of higher density, which together with similar zones of the other elements constitute the surface layer crust 4.

The cross-section of the filter shown in FIG. 4 illustrates the manner in which the surface layer crust 4 serves to encase the core layer 3.

Referring now to FIGS. 5, 6 and 7, the section shown in FIG. 5 is cut from a filter rod formed from 100% softwood sulphate pulp sold by The Buckeye Corporation under the trade reference PV5. The sections shown in FIGS. 6 and 7 are from filter rods formed from a pulp blend, 55% being PV5 and 45% being esparto.

It will be understood that the degree of darkening of the beta radiographs is inversely proportional to the amount of beta ray transmission by the sections. The darkening is therefore directly proportional to the density of the filter material and it can be clearly seen that a crust of greater density exists in each case.

The graphs forming FIGS. 8, 9 and 10 provide confirmation for the visual conclusions from FIGS. 5, 6 and 7. The graphs indicate that beta ray transmission is substantially greater in the central areas of each section indicating that the density of the fibre mass in the centre is less than at the periphery.

The filter may be formed from various fibrous materials, but preferably should have a proportion of stiff bulky fibres to provide a structural matrix, in combination with finer fibres to improve the filtration characteristics and strength. Various loadings may also be added to modify the filtration characteristics.

For the stiff bulky fibres, it is preferred to use highly extracted alpha cellulose chemically bleached pulps containing a high degree of a summerwood, for example Southern pine. Commercially available pulps of this kind are those sold by the Buckeye Corporation under the trade names PV5 and HPZ or those sold by the Rayonier Corporation under the trade name Mersonnier and Ultranier.

For the fine fibres, it is preferred to include in the region of 40% to 50% of fibres having a high specific surface area. Examples of such fibres are esparto, eucalyptus, and cotton. It has also been found that it may be advantageous to remove certain fractions of the fibres in order to obtain an optimum balance of functional properties in the product. As regards loading, it has been found that the addition of up to 10% kaolin or calcium carbonate gives an improvement in filtration efficiency. Other mineral filters, such as diatomaceous earth, may also be used to improve the filtration of vapour phase components. Activated carbon can also be included. However, where loadings are added, it may be also desirable to include binders such as starch or wet strength resins as a stock addition to prevent fluffing occurring in the product. The starch may be cationic or anionic, and the wet strength resins may, for example, be polyamine or polyethyleneimine. Starch may alternatively be applied to the surface after formation of the rod.

It is also possible to include a proportion of any other suitable fibrous material for example synthetic fibres such as polyolefin fibres sold under the trade name SWP by Crown Zellerbach Corporation or under the trade name Pulpex by Solvay and Cie.

Although the fibrous elements described above are for use as filters for smoking products, the material has other uses, such as filters for other materials, for example oil, and it can be used as an absorbent element. Again it need not be made with a circular cross section, it could be square, hexagonal or any other convenient shape according to requirements.

What we claim is:

1. A fibrous element comprising an elongated structure having a fibrous core with discrete fibres arranged in random orientation, said core being stiffened and enclosed by a fibrous crust integral with the core and formed as a surface layer of greater density which also has discrete fibres arranged in a random orientation.

2. A fibrous element as claimed in claim 1 in which a higher proportion of fibres in the surface layer are orientated lengthwise than in the core.

3. A fibrous element as claimed in claim 2, which when parted under tension in a lengthwise direction exhibits substantially coniform interfaces at the point of separation.

4. A fibrous element as claimed in claim 3 in which the fibrous structure has a substantially coniform integrity but contains coniform structures which define at their peripheries the fibrous crust.

5. A fibrous element as claimed in claim 1 in which the fibrous material of the core and crust contains a proportion of stiff bulky fibres in combination with finer fibres, thus providing a structured matrix to improve the filtration characteristics and strength of the fibrous element.

6. A fibrous element as claimed in claim 5 in which the stiff bulky fibres are highly extracted alpha cellulose chemically bleached pulps containing a high degree of summerwood.

7. A fibrous element as claimed in claim 6 in which the fine fibres have a high specific surface area.

8. A fibrous element as claimed in claim 7 in which the fine fibres are taken from the group esparto, eucalyptus and cotton.

9. A fibrous element as claimed in claim 5 in which the fine fibres are present in the concentration of 40% to 50% by weight.

10. A fibrous element as claimed in claim 1 in which the fibrous material of the core and crust contain up to about 10% by weight of an additive from the group comprising kaolin, calcium carbonate, activated carbon and diatomaceous earth.

11. A fibrous element as claimed in claim 10 wherein a binder from the group comprising starch and wet strength resins is present to prevent fluffing occurring during manufacture.

12. A fibrous element as claimed in claim 11 in which the wet strength resins are from the group polyamine, and polyethylenamine.

13. A fibrous element as claimed in claim 1 wherein the surface of the element contains a coating of starch as a binder.

14. A fibrous element as claimed in claim 1 wherein a proportion of synthetic fibres is present.

15. A fibrous element as claimed in claim 14 in which the synthetic fibres are polyolefin fibres.

16. A smoke filter made from the fibrous element of claim 1.

17. The product of claim 16 wherein the smoke filter is a cigarette filter.

* * * * *